Dec. 2, 1941. W. W. LOWTHER Re. 21,965

CRANKCASE VENTILATING SYSTEM

Original Filed Jan. 28, 1937

INVENTOR
Wilfred W. Lowther
By his Attorneys
Merchant & Gilmore

Reissued Dec. 2, 1941

Re. 21,965

UNITED STATES PATENT OFFICE 21,965

CRANKCASE VENTILATING SYSTEM

Wilfred W. Lowther, Minneapolis, Minn., assignor, by mesne assignments, of twenty-five per cent to Frank A. Donaldson, twenty per cent to Margaret Donaldson, six and one-fourth per cent to Mae D. Buckeye, six and one-fourth per cent to Ralph A. Buckeye, ten and six-hundred-and-twenty-five thousandths per cent to A. Donaldson Olin, one and eight-hundred-and-seventy-five thousandths per cent to Philip J. Olin, two and one-half per cent to Richard H. Donaldson, two and one-half per cent to Meredith D. Hellikson, and twenty-five per cent to Ruth C. Donaldson, trustee for Frank A. Donaldson, Jr., Scott Donaldson, and Joan Donaldson Original No. 2,120,050, dated June 7, 1938, Serial No. 122,755, January 28, 1937. Application for reissue November 4, 1940, Serial No. 364,330

8 Claims. (Cl. 123—119)

My present invention relates to crank-case ventilating systems and the like and is particularly directed to means for keeping clean and clear of sediment or other accumulations small air passages or conduits. The present invention is the result of an experience with the crank-case ventilating system disclosed and claimed in my prior Patent No. 2,060,883 of date November 17, 1936. In the apparatus of said patent it was found necessary to employ very small or restricted air passages for limiting the flow of air to and from the crank-case of the engine under the action of varying suction or partial vacuum produced in the action of supplying hydro-carbon vapors to the engine cylinders; and it is further found that under continued use these small air passages would become clogged with tar-like deposits from the hydro-carbon vapors.

The present invention provides an extremely simple and highly efficient device for automatically cleaning out these restricted passages and keeping the same clear of the above and all other deposits. The improved clean-out device works through the restricted passage and is subject to intermittent movements produced by varying action of partial vacuum or suction. In preferred form each clean-out device comprises a stem working through the passage and provided with a weighted lower end and with a head.

In the drawing several of these clean-out devices are shown as applied in a crank-case ventilating system of the type disclosed in my prior patent; and in the description of this application of the invention certain parts that are identical or correspond to parts of the said patent will be indicated by like characters. In the accompanying drawing which illustrates the invention, like characters indicate like parts throughout the several views.

Referring to the drawing.

Figure 1:
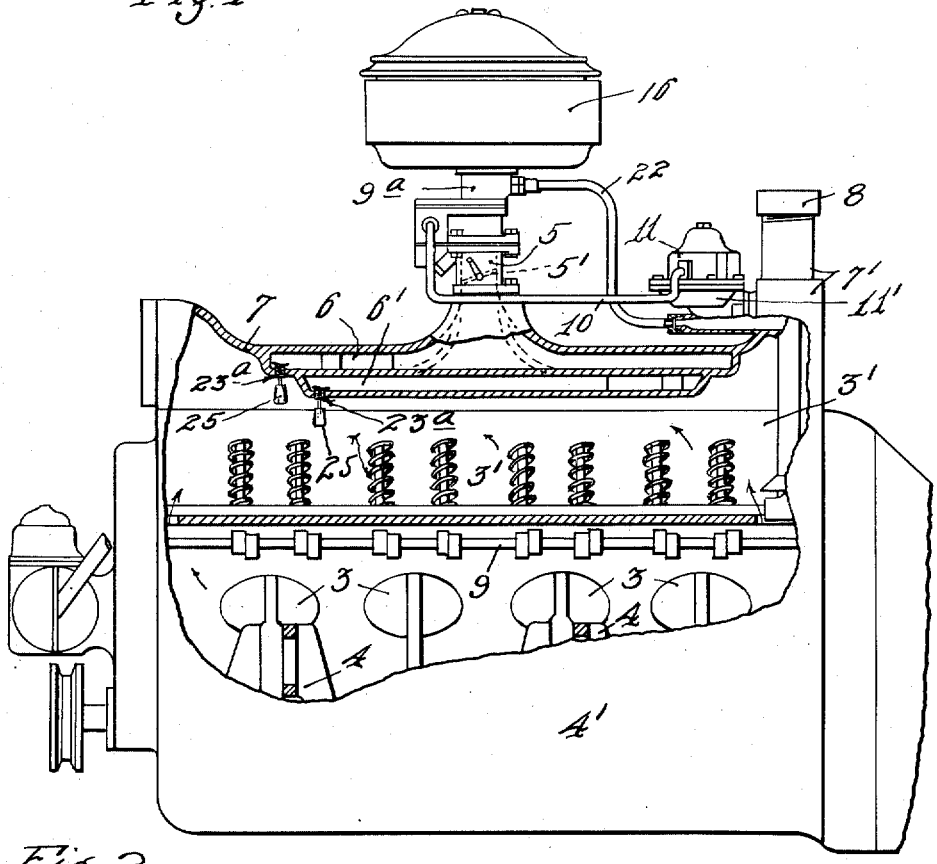
Fig. 1 is a side elevation with some parts broken away and some parts in vertical section, showing the invention applied to a Ford V-8 engine.
Figure 2:
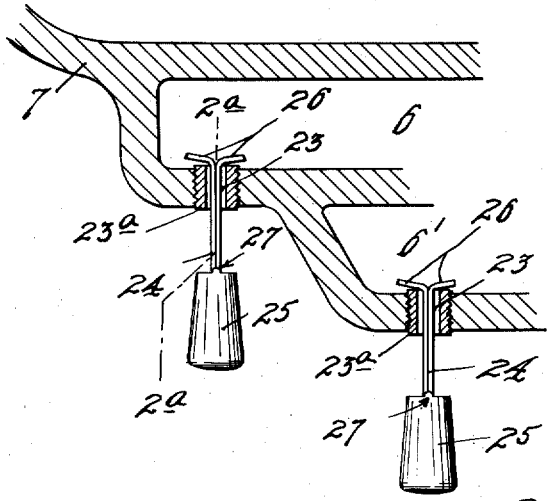
Fig. 2 is a fragmentary detail showing the invention on an enlarged scale and in section, certain of the parts shown in section at the upper left-hand portion of Fig. 1.
Figure 2A:
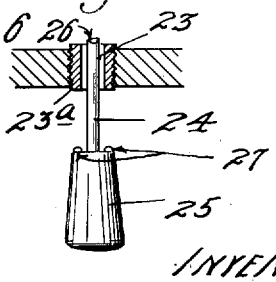
Fig. 2*a* is a section taken on the line 2*a*—2*a* of Fig. 2.

The following step, as hereinafter pointed out, is substantially a repetition of the description of the mechanism of my prior patent.

The cylinder block of the engine, which, as is well known, includes angularly disposed sections, each containing a bank of four cylinders 3, is indicated as an entirety by 3'. The crank shaft is indicated as an entirety by 4 and the crank-case, which latter serves as an oil reservoir, is indicated by 4'. The carburetor, indicated by 5 and which is of the well-known double Venturi tube type, is provided with a throttle valve 5', for each Venturi tube thereof. The carburetor is connected to the engine cylinders through an integrally formed pair of intake manifolds 6 and 6', each of which manifolds extends from an opposite throttle valve controlled Venturi tube and distributes explosive mixture to an opposite bank of cylinders 3. The manifolds 6 and 6' of the Ford V-8 engine, are integrally formed in a plate 7 that extends between opposite block sections and serves to close the intermediate upper portion of the crank-case 4'. In carrying out the invention, the oil filler tube 7' of the crank-case, which is normally open to the atmosphere, is sealed by a screw-threaded cap or the like 8. The carburetor 5 is supplied with gasoline from the supply tank, not shown, through a feed line 10 having interposed therein the customary fuel pump 11. This fuel pump is operated from the engine's cam shaft 9.

The intake of the engine is preferably provided with an air cleaner for removing all impurities from the air before delivery to the engine, but insofar as the invention is concerned, this air cleaner may take various different forms.

In the arrangement illustrated, the clean air discharge tube of the air cleaner 16 is telescoped to the upper end of the upstanding air intake neck or tube 9*a* of the carburetor 5.

Venting of the crank-case and circulation of the air therethrough is brought about by independent connection of points of the engine's intake at opposite sides of the throttle valves 5' to the crank-case at points above the maximum oil level therein. Since it is desired to circulate only clean air through the crank-case, the connections above noted are preferably taken from the intake on the engine side of the air cleaner.

In the preferred application of the invention to the Ford V-8 engine, and as illustrated, a conduit 22 is run from the atmosphere side of the throttle valve-equipped carburetor to the upper rear end portion of the crank-case 4', and conduits 23 are provided for connecting the front top portion of the crank-case to the intake at the engine side of the throttle valve-equipped carburetor. The conduit 22 is coupled to the intake neck 9a of the carburetor and opens into the base 11'' of the fuel pump 11 so as to communicate with the crank-case through the base of the fuel pump and the filler neck. The conduits 23 are in the nature of small holes in the walls of the intake manifolds 6 and 6'. With the connections thus made, the conduits 22 and 23 will both be subject to vacuum or subatmospheric pressure under all operating conditions, but the conduits 23 will be subject to greater vacuum or more greatly reduced pressure than the conduit 22 by virtue of the air restriction offered by the throttle valve-equipped carburetor. This restriction set up by the carburetor, while always existent to some extent, will be at maximum when the throttle valve is closed and will be at a minimum when the throttle valve is open.

When the engine is operating at idle or slow speed, the throttle valve 5' being now closed, will greatly restrict the intake and the resultant difference in vacuum or pressure between points of connection of conduits 22 and 23 to the intake will be so greatly in favor of conduits 23 that the crank-case will be maintained under greater vacuum or lower sub-atmospheric pressure than that existent in conduit 22, and this in spite of the normal piston blow-by gases, which latter tend to raise the pressure in the crank-case. Under these condition, not only will the blow-by gases be rapidly removed from the crank-case, but the said blow-by gases will be instantly diluted with clean air now rapidly circulated through the crank-case. This dilution of the gases with clean air raises the "dew point" temperature of the mixture to a point where it will easily hold its fuel and water vapors during its brief stay in the crank-case. In practice, it has been found practically impossible to remove undiluted blow-by gases from a very cold crank-case with sufficient rapidity to prevent condensation when the moisture-laden gases contact the cold metal parts, but by immediately diluting gases and then rapidly removing the same, as above outlined, condensation is prevented under very severe conditions.

The condition above recited will continue to a varying extent throughout the most used engine speed range, although the difference between crank-case pressure and the pressure in the intake at the point of connection of conduit 22 will be reduced as the speed of the engine is increased, such reduction being due to the following factors, to wit: (a) the reduction in intake vacuum or pressure differential between points of connection of conduits 22 and 23 to the intake, by virtue of reduced intake restriction under increased opening of the throttle valve; and (b) the inevitable increase in the volume of gases blown into the crank-case under increased engine speed. At some point, usually quite high in the speed range and variable according to the cross-sectional areas and relative cross-sectional areas of conduits 22 and 23 and the condition of the engine, the sub-atmospheric pressure in the crank-case will rise slightly above that of the intake at point of connection of conduit 22 thereto, although still remaining below that of conduits 23. At this point, the circulation of engine intake air through the crank-case will cease, the movement of air through conduits 22 reversing and now being from the crank-case to the intake. From this point upward to maximum engine speed, conduits 23 and 22 will function jointly and collectively in withdrawing of blow-by gases from the crank-case and through their joint operation, will retain the crank-case pressure well within safe limits and usually much below that prevailing under like conditions in crank-cases vented by the conventional open breather tube. Since, as before stated, engines are seldom run in the high speed range when very cold, condensation will be prevented by this rapid removal of the gases without dilution by fresh air.

In this preferred application of the invention the restricted passages 23 are formed axially through bushings 23a that are externally threaded into and extend through the bottoms of the chambers or manifolds 6 and 6'. There is a clean-out device for each restricted passage or conduit 23, and in this preferred form each such clean-out device involves a stem 24, to the lower end of which is attached a head or weight 25. The stem 24 is preferably made up of two flat metal strips, the bodies of which lie close together but the upper ends of which are turned outward at 26 to form a sort of upper end head that normally rests on the upper end of the cooperating bushings 23a, but which do not close the passages 23. The stem 24 is of such cross-sectional dimension that it does not completely close the passage 23 but does materially restrict the small passage or conduit. Under normal or equalized pressures the clean-out device will be in its lowered position, indicated in the drawing. When, however, partial vacuum is produced in the chamber or manifold 6 or 6', the upward pull on the heads 26 will lift the cleaning devices to a greater or less extent but usually as far up as they can go. To prevent the weighted lowered ends 25 from closing the passages 23 when the cleaning devices are raised, said heads or ends 25, as shown, are provided with lugs 27 that engage the bottoms of the bushings.

Under the continually varying pressures in the manifolds or chambers the cleaning devices will be given vertical movements which effectually prevent accumulations in the restricted passages and keep the same clear of deposits. For the particular purpose above illustrated the cleaning devices have been found completely satisfactory and highly efficient. However, they will be found efficient in performing similar work in various analogous devices, where small restricted passages or conduits are required to work under conditions where, without continuous cleaning, such passages would be clogged in the course of usage.

In the particular use illustrated in the drawing, to get just the right and properly regulated limited flow of air through the crank-case, it was found that the size of the restricted passages or conduits was highly important and that that being so it was important that the conducting capacity of such conduits remain constant; or, in other words, that even partial clogging or limited accumulations of deposits in these conduits should be prevented. Obviously the device illustrated meets all of these requirements.

A very simple form of clean-out device has been illustrated, but it will, of course, be understood that such devices may vary greatly in form. The clean-out device illustrated, however, is very cheap to make and may be very easily applied and removed, repaired or replaced. The metal strips of the stem 24 may be inserted through the bushings and their ends bent before the bushings are applied. Of course, the device will be removed from working position when the bushings are removed.

In the arrangement illustrated in the drawing it has been found advisable to so weight the clean-out devices that they will not be lifted or moved into action until the suction or partial vacuum has reached about twenty-five percent (25%) of the maximum lifting action produced in the action of the engine by the pressure pulsations.

What I claim is:

1. The combination with an internal combustion engine having a crank-case, and an intake wherein there is a varying degree of sub-atmospheric pressure under operating conditions, of a crank-case ventilating system including a duct extending from the said intake to the crank-case and having a restricted passage, and a clean-out device working in said restricted passage and subject to movement under pressure variations in the intake, said clean-out device keeping the restricted passage free of foreign substance and open to passage of air in all of its axially moved positions and comprising a stem of smaller diameter than said restricted passage arranged to work axially therethrough and being free for lateral wobbling movements therein limited only by engagement of the stem with the walls of the restricted passage, and means for limiting axial movements of said stem.

2. The combination with an internal combustion engine having a crank-case, and a combustion chamber air intake wherein there is a varying pressure under engine operating conditions, of a crank-case ventilating system including a conduit extending from the intake to the crank-case and incorporating a substantially vertically disposed restricted passage, a clean-out device keeping the restricted passage free of foreign substance and open to passage of air in all of its axially moved positions, said clean-out device being in the nature of a weighted stem of less diameter than said restricted passage working axially through said restricted passage and being free for lateral wobbling movements therein limited only by engagement of the stem with the walls of the restricted passage, and means for limiting axial movements of said clean-out stem through the restricted passage under pressure variations in the said intake.

3. The structure defined in claim 2 in which the clean-out stem works through at least one end of the stem-restricted passage and is provided outwardly of the restricted passage with an enlarged weight-acting end, the total weight of which weight-acting end greatly exceeds the weight of that portion of the stem that works in the restricted passage, the over-all weight of the stem being so proportioned, with respect to the varying lifting action produced thereon under such pressure variations in the intake as are frequently encountered during normal engine operation, that the said stem will be raised and lowered between its axial limits frequently during normal engine operation.

4. The structure defined in claim 2 in which the clean-out stem works through the bottom of the restricted passage and is provided below the stem-restricted passage with an enlarged weight-acting head, which head greatly exceeds the total weight of the stem thereabove, the over-all weight of the stem being so proportioned, with respect to the varying lifting action produced thereon under such pressure variations in the intake as are frequently encountered during normal engine operation, that the said stem will be raised and lowered between its axial limits frequently during normal engine operation.

5. The combination with an internal combustion engine having a crank-case and having a combustion chamber air intake duct wherein there is maintained a varying degree of suction under engine operating conditions, of a crank-case ventilating system including a conduit extending from the engine's intake to the crank-case and incorporating a substantially vertically disposed restricted passage, a clean-out device in the nature of a weighted stem of less diameter than said restricted passage arranged to work axially through the restricted passage, said stem being subject to varying lifting action produced thereon as a result of varying suction in the intake and being free for lateral wobbling movements in the restricted passage limited only by engagement of the stem with the walls of the restricted passage, and means for limiting axial movements of the clean-out stem in the restricted passage under suction variations in the said intake, said stem being so weighted that it will be raised and lowered between its axial limits of movement responsive to such suction variations in the engine's intake as are encountered under engine operating conditions.

6. The combination with an internal combustion engine having a crank-case and having a combustion chamber air intake duct wherein there is maintained a varying degree of suction under engine operating conditions, of a crank-case ventilating system including a conduit extending from the engine's intake to the crank-case and incorporating a substantially vertically disposed restricted passage, a clean-out device in the nature of a weighted stem of less diameter than said restricted passage arranged to work axially through the restricted passage, said stem being subject to varying lifting action produced thereon as a result of varying suction in the intake and being free for lateral wobbling movements in the restricted passage limited only by engagement of the stem with the walls of the restricted passage, and means for limiting axial movements of the clean-out stem in the restricted passage under suction variations in the said intake, said stem being so weighted that it will be raised and lowered between its axial limits of movement responsive to intake suction variations within the intake suction variation range between the maximum and about twenty-five percent (25%) of the maximum.

7. The structure defined in claim 5 in which the said clean-out stem is provided outwardly of one end of the passage with a weight-acting head that greatly exceeds the weight of the balance of the stem.

8. The structure defined in claim 6 in which the total weight of the clean-out stem is so proportioned, with respect to the varying lifting action produced thereon under such pressure variations in the intake as are frequently encountered during normal engine operation, that said stem will be raised and lowered between its axial limits frequently during normal engine operation.

WILFRED W. LOWTHER.